United States Patent [19]

Aria

[11] Patent Number: 4,732,333
[45] Date of Patent: Mar. 22, 1988

[54] MULTI-PURPOSE SEPARATION APPARATUS

[75] Inventor: Koichi Aria, Kanagawa, Japan

[73] Assignee: Arai Corporation, Kanagawa, Japan

[21] Appl. No.: 923,283

[22] Filed: Oct. 27, 1986

[51] Int. Cl.⁴ ............................................... B02C 18/10
[52] U.S. Cl. ................................. 241/46.17; 241/57; 241/69; 241/199.7; 241/199.12
[58] Field of Search ............... 99/495, 510; 241/46.17, 241/46 R, 46.04, 57, 285 R, 79, 199.7, 205, 199.6, 277, 199.1, 69, 73, 199.2, 199.3, 199.4, 199.5, 282.1, 199.12, 282.2

[56] References Cited

U.S. PATENT DOCUMENTS

| | | | |
|---|---|---|---|
| 1,915,053 | 6/1933 | Dobyns | 241/282.2 |
| 2,384,326 | 9/1945 | Martindale | 241/69 |
| 2,963,281 | 12/1960 | Reiffen | 241/69 X |
| 3,809,322 | 5/1974 | Hirosawa | 241/199.7 X |
| 3,945,576 | 3/1976 | Kahmann | 241/46.17 |

FOREIGN PATENT DOCUMENTS 925389  5/1982  U.S.S.R. ........................ 241/199.12

Primary Examiner—Mark Rosenbaum
Attorney, Agent, or Firm—Rosen, Dainow & Jacobs

[57] ABSTRACT

A multi-purpose separation apparatus comprises a container body movable upward and downward freely in which is provided a cylindrical filter element having functions such as separating and grading, with which is provided a lid having a pressured gas transfering means for pressing in, extracting, and extruding, and to which a driving source is connected; a rotary blade device for preventing clogging of the filter element and/or for stirring; a support structure for guiding the upward and downward movement of the container; and a discharge valve device for taking out a material treated through the filter element.

6 Claims, 3 Drawing Figures

MULTI-PURPOSE SEPARATION APPARATUS

BACKGROUND OF THE INVENTION (1) Field of the Invention

This invention relates to a multi-purpose separation apparatus to be used for various and many uses such as filtering which separates solid and liquid, extracting liquid from solid material, or further taking out by grading the same sized powder particles from different sized materials.

(2) Description of the Prior Art

In the conventionally known type of separation device, it is presently impossible to use a single separation device interchangably for different purposes except for a device specified for only one purpose such as a filtering device for filtering, a grading device for grading, an expressing device for expressing liquid from solid ingredients.

Separating devices such as filtering and grading devices have been used for a number of purposes and ways in the food processing field nowadays. For example, it has been a problem that almost all of the cooking preparations such as making soup, potage, juice, coffee, etc. in the kitchen of a hotel or a restaurant are still manual work and even if some machinery is employed, the machinery could not be used for the purposes other than the particular one for which it was specifically designed.

Further even though it is desired to utilize machines and specially specific machines in the manufacturing and industrial fields other than food processing industry, there has been another problem that there is not available any single separating device usable for various purposes.

BRIEF SUMMARY OF THE INVENTION

In consideration of the above problems, this invention is made to provide a multi-purpose apparatus which could be used in numerous ways by providing a filter element having the functions of separating, grading, pressing-in etc. of a desired material contained in a container body, by providing a rotary blade device to stir as well as to prevent the strainers from becoming clogged and/or stirring, and by the multi-purpose device, separating solid and liquid by filtering grading powder particles to a required size, by extracting liquid from solid ingredients, by further pressing-in of the solid material to take out the material treated through said filter element, and by having a support structure to let said container move upward and downward.

Further, another purpose is to provide a multi-purpose separation apparatus provided with a pressured gas transferring means which promotes the separation and grading functions in the container body and further the container is movable upward or downward by an optional driving method.

Into the interior of the container body, a material for filtering, a solid and liquid mixture for extracting, a powder particle material for selecting a particle of a necessary diameter, original materials and liquid for stirring and disolving are supplied, and the treated materials can be taken out through the discharge valve device together with the function to prevent the filter element from being clogged by the rotary blade device.

Further it is clear that the size of the receiver to take the treated material out causes no inconvenience since the height of the container body could be adjusted so easily, and further the filtering efficiency could be increased by treating materials under some pressure by pressured gas transfering means in the case of a liquid high in its viscosity.

BRIEF DESCRIPTION OF THE ACCOMPANYING DRAWINGS

PREFERRED EMBODIMENT OF THE INVENTION

Figure 1:
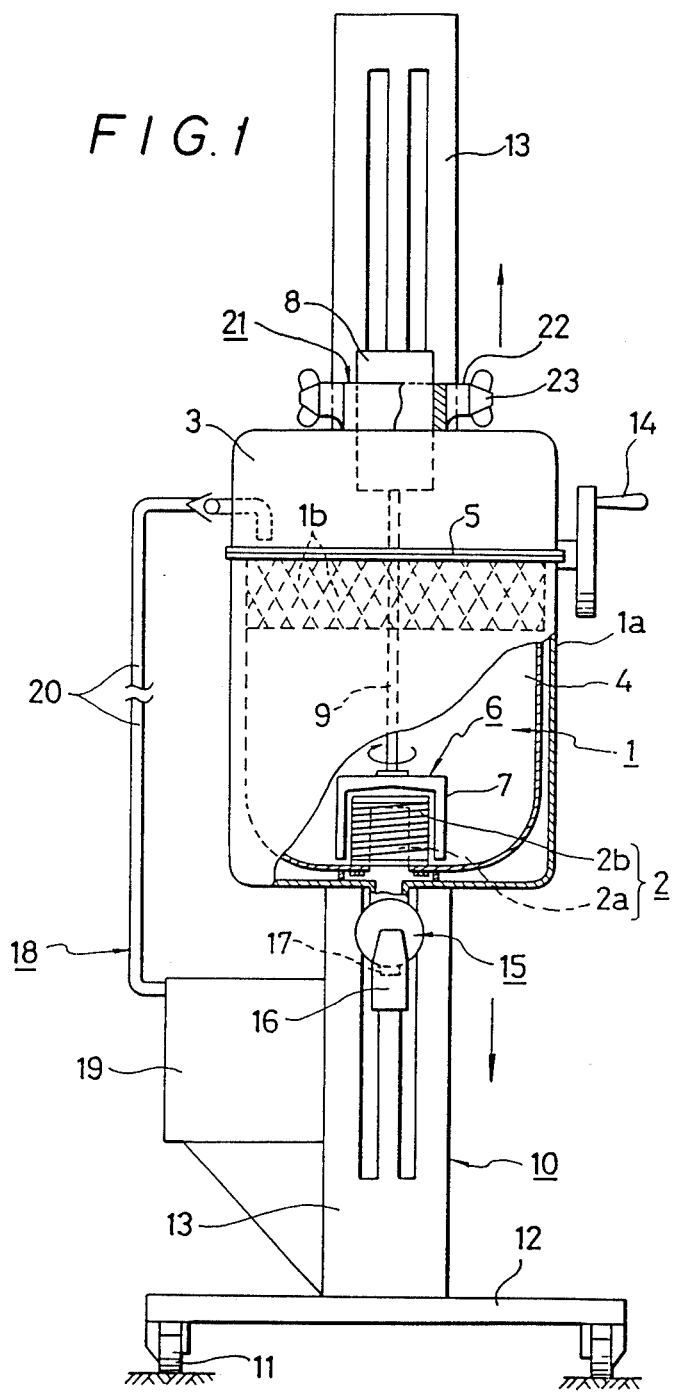
FIG. 1 is a partial cutaway view of a multi-purpose separation apparatus embodying this invention.
Figure 2:
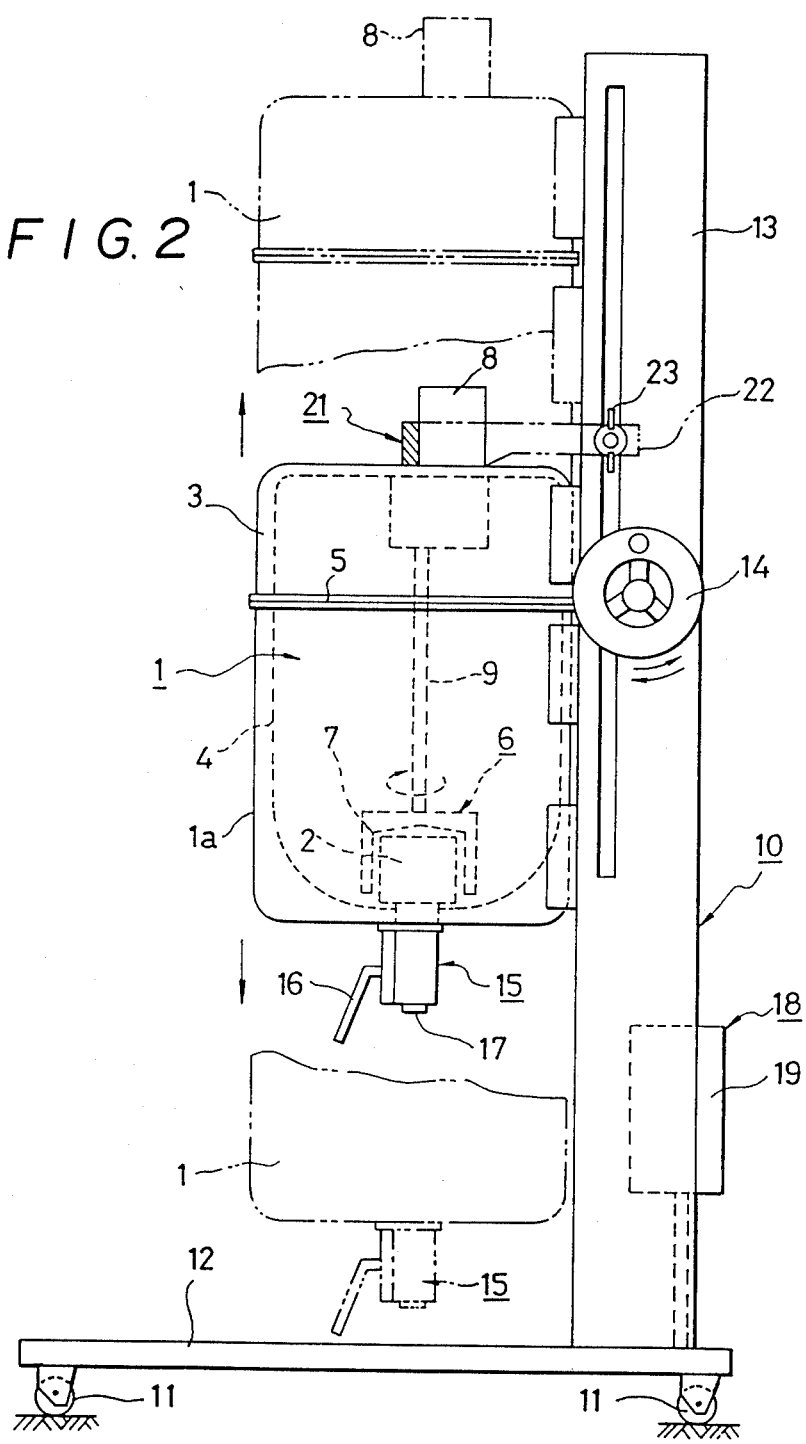
FIG. 2 is a side view of the apparatus.
Figure 3:
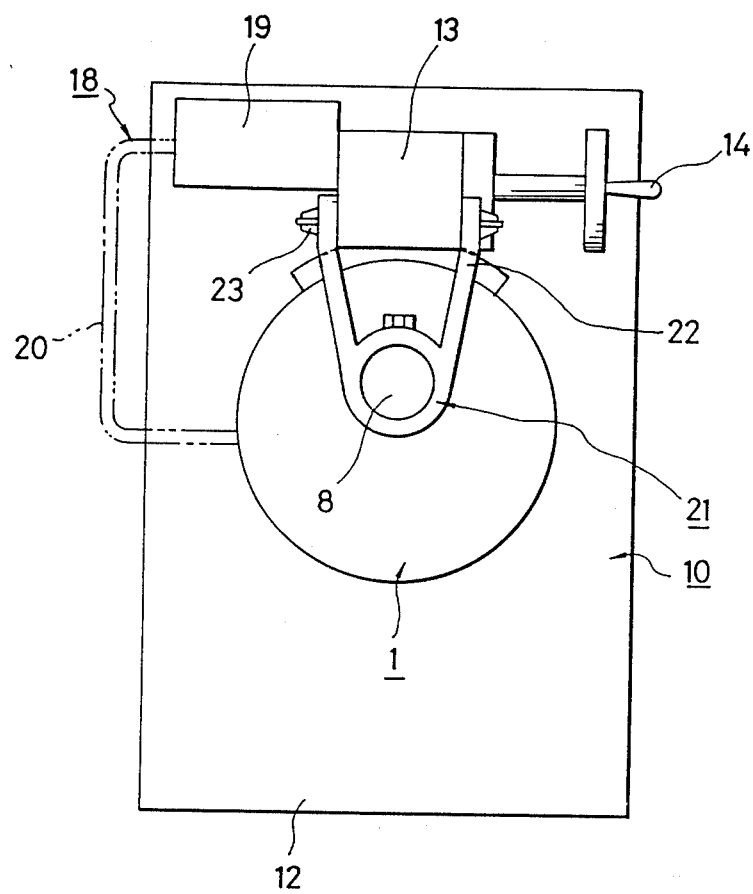
FIG. 3 is a top view of the apparatus.

An embodiment of this invention is explained in the following paragraph. 1 is a container body and 2 indicates a filter element arranged at the bottom of the container body 1, for filtering a liquid and expressing a liquid from solid ingredients, separating a particular sized powder particle out of powder particles in the various sizes, or straining a soup, pushing in or pushing out materials in particle form, by fixing any attachment as desired specifically or interchangably.

In the drawing, a type of filter element 2a of cylindrical shape is shown with a head portion wherein through holes are formed, and with a sectionally triangle shaped wire 2b wound on a threaded groove on the periphery of the cylinder. The filter element could be a flat shaped or cylindrically shaped and holes could be so called punched holes or could be formed in porous form entirely, but is not limited to those arrangements.

Further, said container body 1 could be single structured, or could be provided with an ornamental cover as shown in the drawing. The opening and contact part 5 is desirably tightly fixed by a fixing part (not shown in the drawing).

6 indicates a rotary blade device equipped with rotary blades 7 which prevent said filter element 2 from being clogged and stir the peripherical areas of the element 2. The driving source 8, that is, electric motor is fixed integrally into the lid 3 fitting to said container body and said electric motor is connected and fixed to said rotary blades 7 directly or in the indirect method by a speed reducing means through the rotating axle 9. Moreover, the driving source 8 is not necessarily fixed to the lid 3, and could be arranged to go in or out through an opening bored in the lid 3. (Not shown in the drawing)

10 is a support structure to support the container body, having supporting means capable of moving up and down a support pole 13 erected on one side of a bottom plate 12 provided with casters 11, said support structure being capable of moving up and down said container body 1 by a known technical method utilizing components such as a rack, pinion, or wire, operated by a manual handle 14 on the supporting pole 13.

Nevertheless, by replacing said manual handle 14 with an electric motor, it is possible to move the support structure upward and downward, or stop it at any optional position by a switch button. (not shown)

15 is a discharge valve device which is installed at the lower part of the filter element 2 provided in said container body and constructed to enable taking out the treated material through an outlet 17 equipped with a valve, operated by a knob 16, a known lever, cock or press button system (not shown).

18 is a pressured gas transfering means to apply pressured gas to the container body from a compressor 19 fixed on the support structure 10, the pressured gas transferring means being adjustable to any height of the conainer body and movable up and down and disposed partially or wholly with a flexual pipe 20 such as a tube or pipe. Further this pressured gas transfering means 18 could be connected directly to the container body 1, and its pressure could be adjustable by utilizing a valve connected to another compressor (not shown).

Further some parts such as a pressuring plate can be housed in the interior of the container body and the operation can be done by mechanically made pressure.

However, since treating material by its natural weight alone is often enough for some kinds of material, it is possible to operate the filtering device without the pressured gas transferring means, and as the result make the pressing means optional at the customers' desire to reduce the operating costs. In this case it is recommended to provide holes in the lid 3 to let air go through to prevent creating a vacuum state there.

21 indicates a lid holding device capable of holding firmly the lid 3 to fit to the container body together with the driving source 8 of the rotary blade means 6 at the desired height position on the supporter of the supporting structure. For example by providing a press holder 22 connected to the driving source (electric motor) and the supporter 13, and by holding temporarily by the holder (Wing nut or hook) the lid holding device at the necessary height, it is possible to supply effectively the material to be treated to the interior of the container 4 or cleanse the interior. However, this lid holding device could be omitted by constructing the lid 3 to be freely detachable from the container body 4, and therefore, said lid holding device 21 is not limited to the embodiments mentioned above.

Further, said rotary blade device 6 could be equipped with mixing blades (not shown) on the rotary shaft 9 from the beginning if necessary, or could be fixed with them later as needed. Additionally in the case of a container body having an ornamental cover, a freely detachable mesh 16 could be provided along the marginal opening.

As constructed above, at the time of filling the inside of the container body with a material required to be treated the lid 3 could be taken out beforehand, or could be held firmly temporarily at a high position on the supporter 13 and could be closed tightly after a required quantity of the material is placed in the interior of the container body 4.

In the case that a material to be treated which is stored in the interior of the container body is low in density and viscosity and easily filtered, simply by preventing the holes of the filter element 2 from being clogged by operating the rotary blade device 6, the treated material could be obtained by receiving in the interior of a container placed on the bottom plate 12 on the support structure through a discharge valve device. In the case that the material treated is high in density and viscosity and difficult to be treated, by both attaching the blades for mixing and applying pressured air transfering means 18, it is possible to treat the material effectively.

The simple filtering of a liquid, mixing of a soup potage, of course straining and mixing, extracting and filtering a juice, a coffee etc., further pressing in for pulper and extruding for the items required for cooking at a hotel or a restaurant, can be effected for various purposes by exchanging the filter element 2 with any device structured as needed and utilizing the rotary blade device for stirring interchangeably or both.

In the case that the material to be treated is a powder particle material it is possible to treat it accordingly by selecting a filter element 2 necessary to treat the powder particle material for any required size. Further when the container body becomes dirty after some use, by removing the lid 3 first, the interior of the container body could be cleansed directly with water poured in or could be washed after the container being taken out.

Further the support structure 10 is easily movable and is handled freely by the casters fixed to the bottom plate.

Further while it is explained in the embodiment stated above that the container body itself is capable of being moved upward and downward it is quite all right to leave the container body fixed and alternatively to let the lid 3 together with rotary blade device 6 be moved upward and downward. In this invention, the filter element itself has not only a function of filtering but also a function of separating by size and pressing in and extruding in the case of, for example, a pulper, and the container body has a function that the rotary blade device can of course prevent the holes of the filter element from being clogged and a function to stir or mix the material to be treated. This filter element enables the treatment of a wide range of materials and diversifies the purpose to various uses starting from a mixture of solid and liquid materials to be treated, a mixture of solid and powder, and even to all solid or powder material. Further this invention makes the handling convenient and improves efficiency since the container body is movable upward and downward by the supporting structure thereof.

As above, there have been described one embodiment of the invention including various and modified points but the embodiments of the invention, without being confined to the examples per the embodiment particularly in the devices such as a container body, support structure and etc., could be modified in numerous ways within the technical concept of the invention.

What is claimed is:

1. A multi-purpose separation apparatus, comprising
 a container mounted to be selectively vertically movable and having an aperture in its bottom,
 a filter element mounted at the bottom of said container body covering said aperture, for separating and grading material in said container, said filter element having a filter surface through which matrerial being filtered passes through from said container,
 a driving source mounted to said container,
 a rotary blade device mounted in said container and connected to be driven by said driving source,
 a support structure for holding said container while enabling vertical movement thereof, and
 a discharge valve device coupled to said aperture for passing materials that have passed through said filter element,
 said rotary blade device comprising blade means arranged to inhibit clogging of said filter means at said surface upon rotation of said rotary blade device and to mix materials in said container upon rotation of said rotary blade device.

2. The multi-purpose separation apparatus as claimed in claim 1 in which the container comprises a lid and a container body and said container body is provided with a pressured gas transfering device by which separating and grading efficiency is increased.

3. The multi-purpose separation apparatus as claimed in claim 1 in which the filter element is cylindrical and said blade means of said rotary blade device is rotatable along the periphery of said cylindrical element.

4. The multi-purpose separation apparatus as claimed in claim 1 in which the rotary blade device comprises rotary blades for the filter element and for stirring.

5. The multi-purpose separation apparatus of claim 1 wherein said container comprises a container bottom and a lid, said driving source being mounted on said lid, and further comprising a shaft extending downward through said container bottom for driving said rotary blade device.

6. The multi-purpose separation apparatus of claim 5 wherein said filter is cylindrical and has vertical filter surfaces, said blade means comprising vertically extending blades positioned to inhibit clogging of said surface upon rotation of said rotary blade device.

* * * * *